Feb. 21, 1967 W. F. PRAEG 3,305,662
APPARATUS FOR ELECTRIC RESISTANCE WELDING
Filed May 4, 1965 5 Sheets-Sheet 1
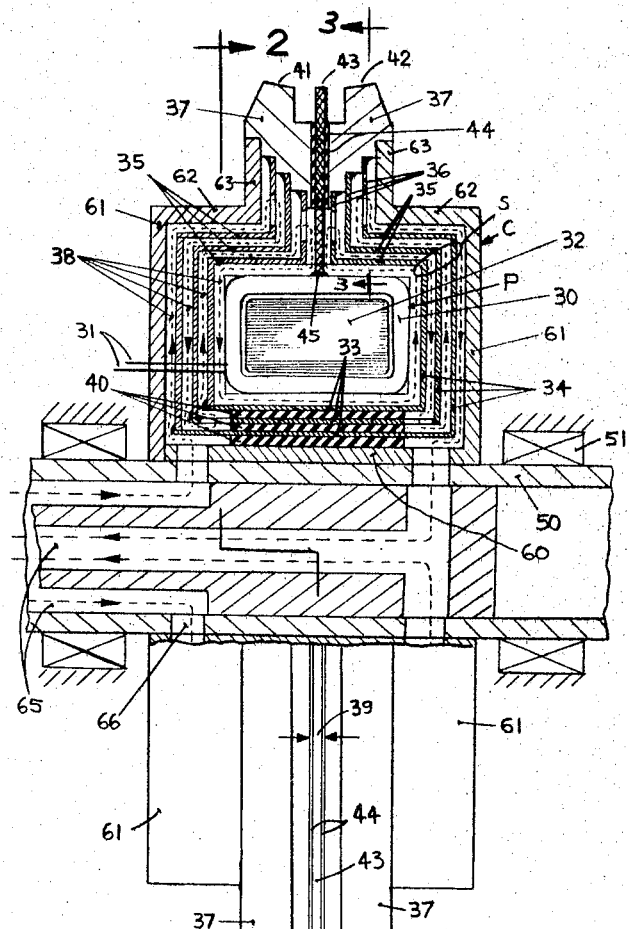
FIG. 1
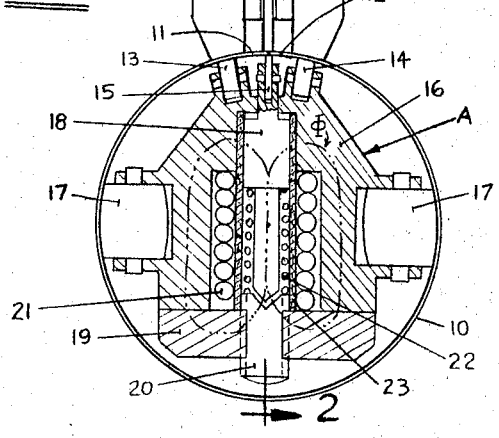
Walter F. Praeg
by Morris Spector
atty

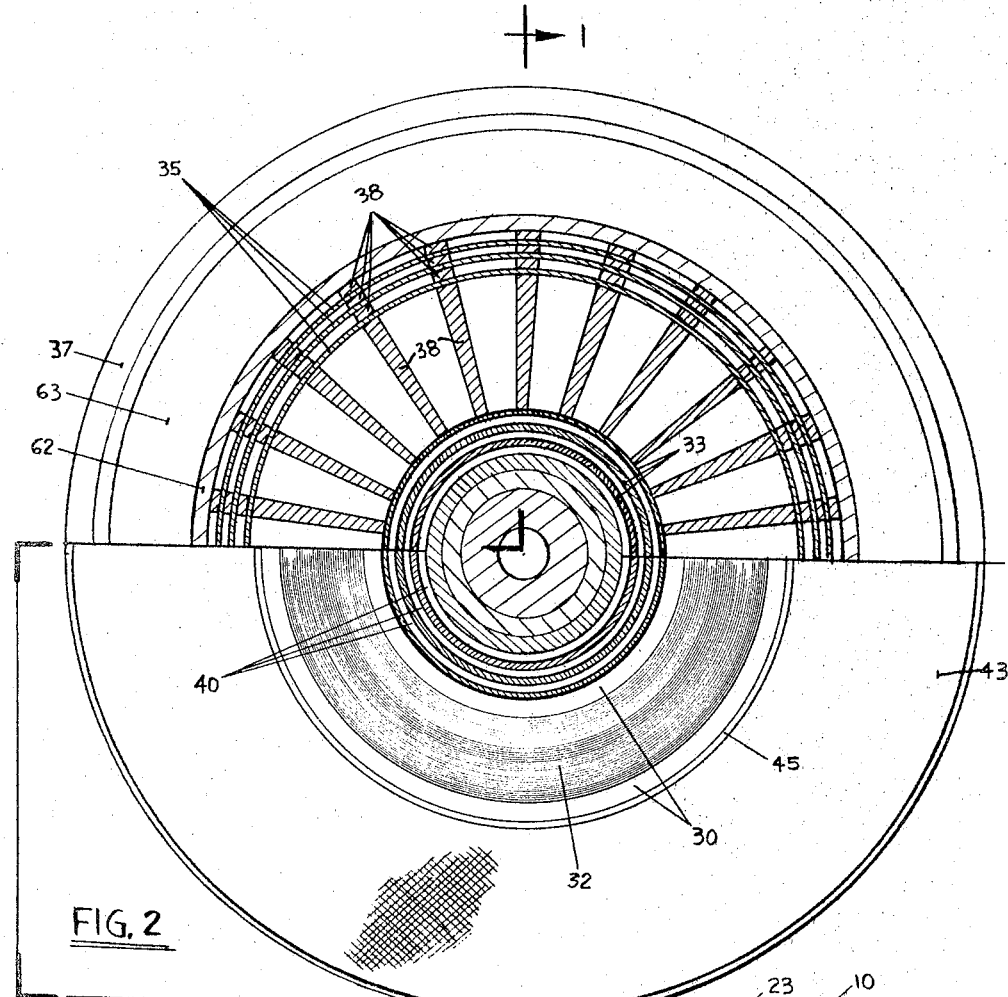
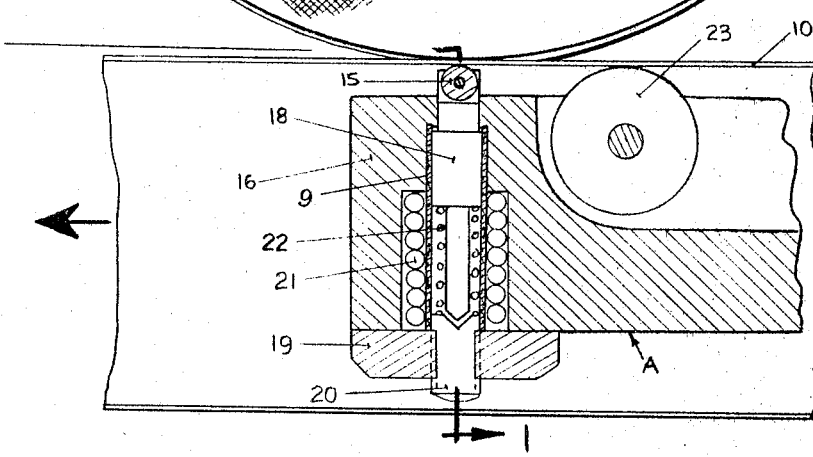
FIG. 2
Walter F. Praeg
by Morris Spector atty

Feb. 21, 1967 W. F. PRAEG 3,305,662
APPARATUS FOR ELECTRIC RESISTANCE WELDING
Filed May 4, 1965 5 Sheets-Sheet 3
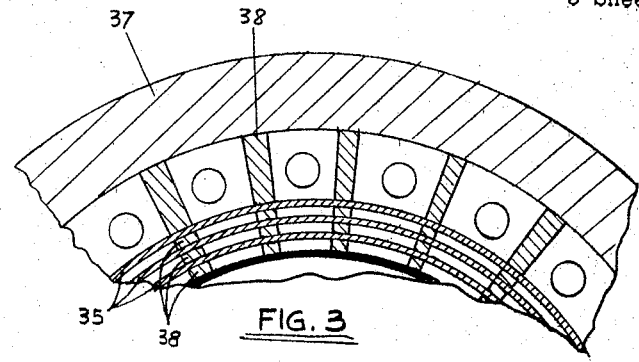
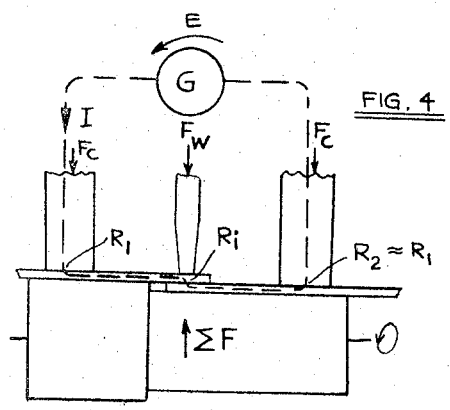
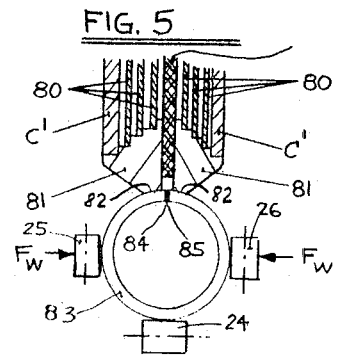
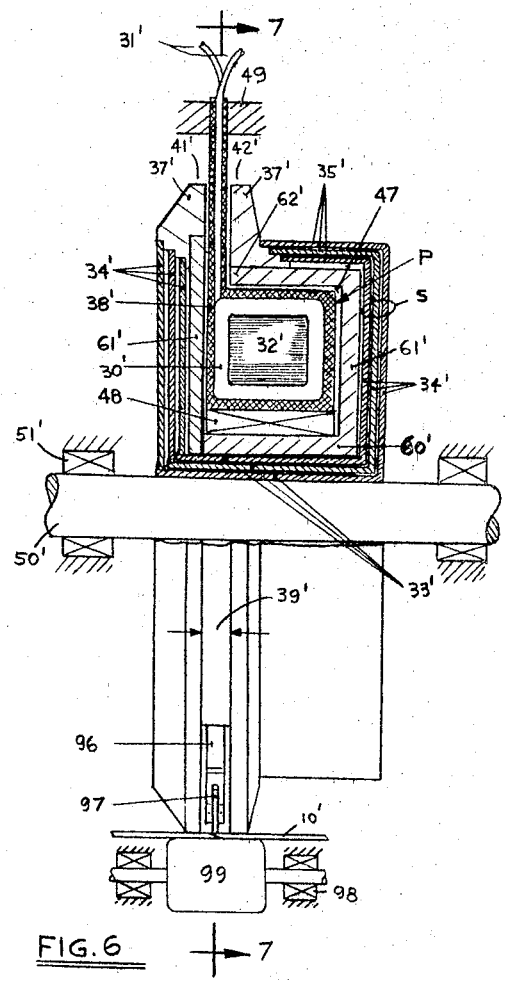
Walter F. Praeg
by Morris Spector atty.

Feb. 21, 1967 — W. F. PRAEG — 3,305,662
APPARATUS FOR ELECTRIC RESISTANCE WELDING
Filed May 4, 1965 — 5 Sheets-Sheet 4

Walter F. Praeg
by Morris Spector atty.

United States Patent Office 3,305,662
Patented Feb. 21, 1967

3,305,662
APPARATUS FOR ELECTRIC RESISTANCE
WELDING
Walter F. Praeg, Palos Park, Ill., assignor to National
Can Corporation, Chicago, Ill., a corporation of Delaware
Filed May 4, 1965, Ser. No. 453,161
15 Claims. (Cl. 219—63)

This invention relates to improvements in the art of seam welding and, more particularly, to the construction of rotary transformers, to electromagnetically operated weld pressure electrodes and to means for minimizing loss of current as may tend to flow through previously welded portions of the work.

It is known to provide rotary transformers to electrically energize a pair of opposed metallic edges to be progressively welded together, such transformers being comprised of a multi-turn toroidal primary winding enclosed by a one-turn secondary winding. Said secondary winding has a circumferentially extending split or gap located radially beyond the outer periphery of the primary, and a pair of circumferentially extending contact surfaces, one on each side of the split, adapted to engage the metal to be electrically energized.

It has been conventional heretofore to form the one-turn secondary from solid copper of sufficient cross-section to carry weld currents of thousands of amperes. There is a desire to perform welding operations at relatively higher speeds and therefore with alternating currents of frequencies higher than 60 c.p.s. An added advantage of higher operating frequencies is that for a given voltage the transformer core cross-section becomes smaller as the frequency is increased, thus resulting in a smaller physical size of the transformer assembly.

At higher frequencies the current distribution over the cross section of the secondary is no longer uniform, due to skin effect and eddy currents. As an illustration of the skin effect due to eddy currents, the thickness, measured from the surface carrying 64% of the current in a thick copper sheet, is tabulated below for various frequencies:

| Frequency $f$ | 100 | 1000 | 10000 | 100000 | c.p.s. |
|---|---|---|---|---|---|
| $f$ thickness | 0.262 | 0.0837 | 0.0262 | 0.00837 | inch |

It becomes apparent from the above that a transformer secondary made of thick copper is inefficient at higher frequencies. Therefore, one object of the invention is to provide a rotary welding transformer embodying novel and improved construction and arrangement of secondary conductors associated with each other and with the primary. The conductors shall be capable of handling large currents at relatively high frequencies, and there shall be free circulation of a coolant, if desired, so that electrical losses and physical dimensions are kept to a minimum.

The heat equation $$H = I^2 R_i t$$

where
$I$ = welding current
$R_i$ = interface resistance
$t$ = welding time must be controlled most carefully, for it has the greatest effect. $R_i$ is influenced by the electrode pressure which changes the contact resistance. Everything else is equal; with the increase in pressure the current increases, and vice versa. The effect on the total heat generated, however, may be the reverse. As pressure increases, the contact resistance $R_i$ decreases and more current is required to produce a satisfactory weld.

Another object of the invention is an electromagnetic pressure device which compensates for changes in interface resistance. The device is actuated either directly from the current flowing through the transformer primary or via a feedback loop from a current proportional to the primary transformer current.

Various other and more specific objects, features and advantages of the invention and preferred embodiments will be described in this specification and illustrated in the accompanying drawings as part hereof and wherein:

FIG. 1 is a view taken on line 1—1 of FIG. 2 of a rotating type transformer in operative relationship with a C-shaped tube with overlapped edges welded together, all illustrating a preferred embodiment of the invention;

FIG. 2 is a view of FIG. 1 taken approximately on line 2—2 thereof;

FIG. 3 is a partial view of FIG. 1 taken approximately on line 3—3 thereof;

FIG. 4 is a simplified diagram illustrating the path of the welding current and electode arrangement when seam-welding overlapped sheets;

FIG. 5 illustrates an arrangement for butt-welding in accordance with the invention;

FIG. 6 is a view somewhat similar to FIG. 1 but illustrating an alternative embodiment of the invention as applied to lap seam-welding taken on line 6—6 of FIG. 7a;

Figure 7A:
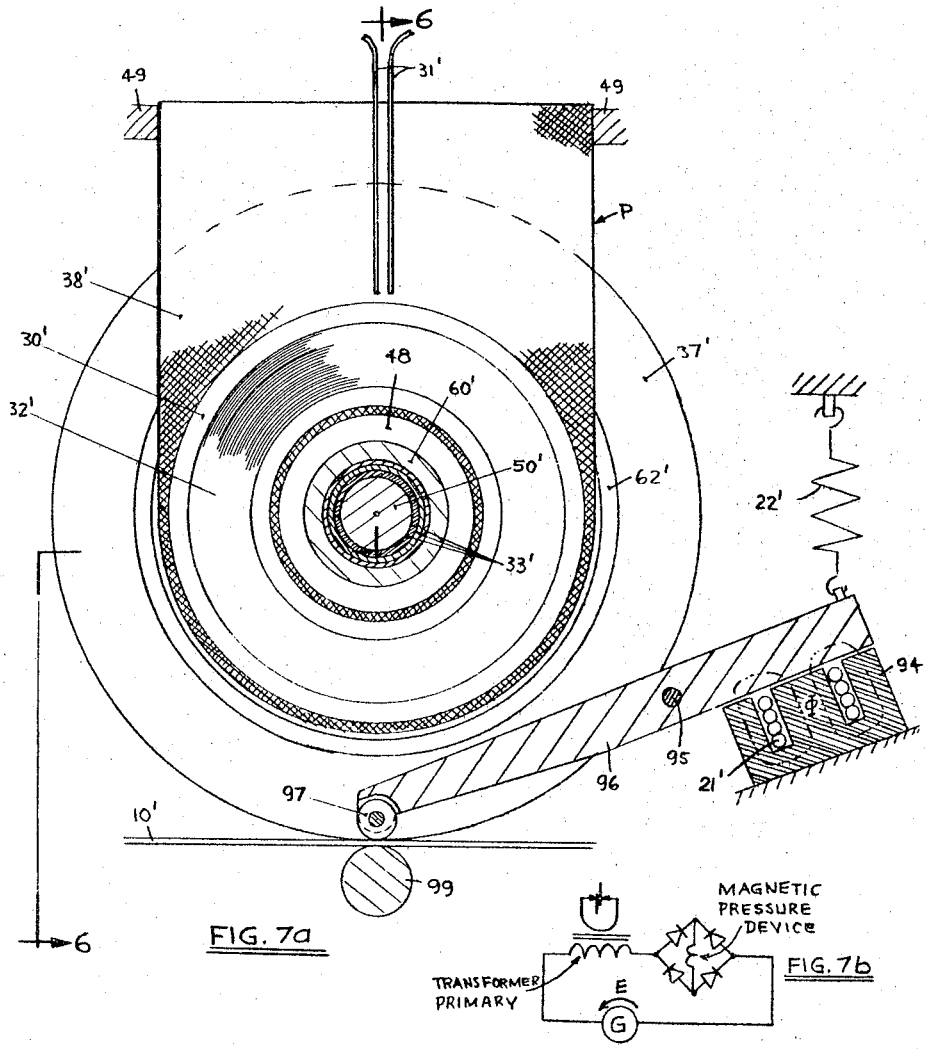
FIG. 7a is a view of FIG. 6 taken along line 7—7.

Referring to FIGS. 1 and 2 in more detail, a length of tubular stock 10 with overlapped edges 11 and 12 to be welded is being advanced in the direction of the arrow by means (not shown) commonly known in the art and cooperating with support rollers 17 and 9 of assembly A.

The toroidal transformer is generally comprised of a multi-turn primary P and an outer surrounding one-turn multi-layer toroidal secondary S arranged to electrically energize the contact surfaces 41 and 42 as will appear. These contact surfaces 41 and 42 engage stock 10 and energize edges 11 and 12 respectively, at the point where they are brought together to cause a welding current to flow therebetween.

The construction of the primary P is no part of the present invention and may consist of coil 30 having a pair of terminal leads 31 extending externally of the transformer to slip rings, not shown. The primary may also include a magnetically permeable core 32 of any desired construction, either of laminated material or of powdered material. The core material will depend upon the frequency of operation of the transformer. Up to about 15,0000 c.p.s. laminated cores are usually suitable. For higher frequencies, e.g. 100,000 c.p.s., powdered core material is used.

The secondary S completely surrounds and encloses the primary P, with the exception of split 39.

The secondary winding is comprised of spaced radially inner circumferentially extending coaxial cylinder portions 33; spaced circumferentially extending axial end portions 34; spaced radially outer circumferentially extending coaxial cylinder portions 35; spaced circumferentially extending portions 36, and a pair of contact discs 37.

These portions are made from material of high electrical conductivity, e.g. copper, having a thickness that assures approximately uniform current distribution over their cross section at the transformer operating frequency. Cylinder portions 33 are spaced from each other and supported by solid rings 40 made from electrically insulating material of suitable strength. All other portions making up the secondary are spaced and supported by a number of spacers 38 made from electrically insulating material of suitable strength. The portions making up the individual shells of the secondary are all in electrically conductive relationship. Physically they may be made in several pieces and fastened together by brazing, bolting and otherwise.

The primary assembly P is supported by the secondary through spacers 38 and other means mentioned later.

The secondary winding S and contact discs 37 are supported by frame C comprised of radially inner circumferentially extending portion 60, circumferentially extending axially end portions 61, radially outer circumferentially extending portions 62, and circumferentially extending axially portions 63. Frame C may be made of steel or any other suitable material. Frame C is mounted for rotation about the axis of the toroid by means of shaft 50 extending through the central opening of the transformer assembly defined by portion 60. Shaft 50 is rotatably supported by bearings 51, in turn, supported by the base of the machine. Of course, if the shells making up the secondary are rigid enough to support discs 37, frame C might not be required.

The split 39 accommodates steel discs 43 serving as a welding pressure wheel, and insulating discs 44. If desired, discs 37, 43 and 44 may be bolted together by electrically insulated bolts, not shown, as is known in the art. In this manner, radial forces on the contact surfaces 41 and 42 and on pressure disc 43 are transmitted directly to frame C and thence to the shaft 50.

Obviously, if shaft 50 is of sufficient strength, it need only be supported at one axial end by one or more bearings. It will also be appreciated that the transformer assembly might rotate simply because of the contact pressure between surfaces 41 and 42 and the tube 10. Alternately, power-driven means may be provided for rotating the transformer via shaft 50, as is known in the art.

The coolant circulating system includes coaxial bores 65 in shaft 50 and transverse ducts or holes 66 leading from the bore to the space between insulators 38 of the transformer assembly. As shown, the coolant enters on the left-hand side through holes 66 between frame C and the outer or first shell of the secondary S. After flowing radially outward towards the left-hand disc 37, it enters the space between the insulators 38 which separate the first and second shell of the secondary S through holes in the periphery of the first shell, as illustrated for the right-hand portion of the first shell in FIG. 3. The coolant is now forced to flow between the first and second shells toward shaft 50. Once the coolant reaches portions 33, it is forced to flow through holes located on the second shell into the space between the second and third, or inner, shell of the secondary and upwards towards disc 37. From there, through holes in the inner shell, it enters the space between the primary P and secondary S and flows around the primary and back through the right-hand portions of the secondary shells in much the same way as described for the left-hand portions. Finally the coolant returns through the center bore of the shaft. The inner diameter of disc 43 is separated from the primary P by a rubber gasket 45. This separates the left-hand and the right-hand coolant paths and gives additional support to the primary.

Obviously, there may be more secondary shells than shown in FIG. 1. Their number will depend upon both the operating frequency (which determines shell thickness) and the secondary current (which determines the number of shells required).

Alternating currents flowing through primary coil 30 will, by transformer action, generate an alternating voltage E in the secondary S which appears across the split 33 and is conducted to the work 10 through surfaces 41 and 42.

As illustrated by FIG. 4, the welding current flows through contact resistances R1 and R2 between the contact surfaces of the toroidal transformers (41 and 42 in FIG. 1) and the work (10 in FIG. 1) and through the interface resistance $R_i$ (between edges 11 and 12 of FIG. 1). Since only $R_i$ contributes to the weld, R1 and R2 are made small by using relatively large contact surfaces and applying considerable force $F_c$. This minimizes the heat generated on the contact surfaces and reduces contact surface maintenance. The weld pressure $F_w$ on the independently adjustable weld electrode is set to achieve an optimum value of interface resistance $R_i$, thus producing a weld with the least amount of energy. Since the weld pressure electrode does not carry current, it can be built relatively small, having a low inertia. This, in turn, lends itself to feedback loops that adjust pressure, and thereby $R_i$, as weld conditions change due to fluctuations in the surface resistance of the work. Such a feedback circuit is incorporated in assembly A, which supports tubing 10 in FIGS. 1 and 2.

The pressure of contact surfaces 41 and 42 against work 10 is sustained by rollers 13 and 14, in turn supported by arm 16 of assembly A. Weld pressure at the interface of the slanted edges 11 and 12 is exerted by pressure roller 15 and sustained by disc 43. Pressure roller 15 is rotatably mounted in cylinder 18, which, in turn, is guided in the non-magnetic tube 23. Static pressure $F_s$ is obtained and adjusted by compressing spring 22, arranged between the sleeve of cylinder 18 and adjustment screw 20 located in cover-plate 19.

Arm 16, cylinder 18, cover-plate 19 and adjustment screw 20 are made of magnetically permeable material. Therefore, when connecting the primary current to copper windings 21, its flow will generate flux $\Phi$. This flux tries to shorten the conical air gap between cylinder 18 and screw 20, thereby exerting a force $F_M$ on cylinder 18 that tends to pull pressure wheel 15 away from the work.

The opposing forces of spring 22 and the magnetic pull are adjusted for optimum weld conditions, $F_W = F_S - F_M$. If in the process of welding a seam the interface resistance increases, the primary current will be reduced $(I \times E/R_i)$ and with it flux $\Phi$ and the magnetic pull $F_M$ on cylinder 18. This causes more spring pressure to be exerted on wheel 15, thus reducing the interface resistance.

On the other hand, if in the course of welding the interface resistance drops, the primary current will increase and with it the magnetic pull $F_M$ on cylinder 18. This will reduce the pressure on wheel 15, thus increasing the interface resistance. In the above manner the feedback from the primary welding current to the weld pressure wheel assembly tends to keep the interface resistance at a given value.

The above pressure feedback circuit is applicable to seam welders which do not incorporate toroidal transformers. However, since the ratio of interface resistance to total transformed circuit impedance determines the sensitivity of the feedback circuit, it is especially useful in association with toroidal welding transformers because they have a much smaller source impedance than other arrangements of welding electrodes.

Of course, a similarly acting feedback loop could be obtained by monitoring the primary current by other means (shunt, current transformer, etc.) and using this signal suitably amplified to energize coil 21.

An application of the invention to butt-welding seams is shown in the partial cross section of a transformer secondary in FIG. 5. The liquid cooled shells 80 of the secondary are silver-soldered to a pair of contact discs 81 which have contact surfaces 82 engaging tube 83, its edges 84 and 85 to be butt-welded together. Frame $C^1$ supports the transformer secondary assembly. Rollers 24, 25, 26 and others not shown support and advance tube 83. Somewhat similar to the pressure arrangement described in FIGS. 1 and 2, the weld pressure between edges 84 and 85 is obtained by mechanical and magnetic forces operating on rollers 25 and 26. Again the magnetic forces are proportional to the primary current of the toroidal transformer and oppose the mechanical forces acting on rollers 25 and 26.

FIGS. 6 and 7 show an alternative embodiment of the invention. In FIG. 6 the inner coaxial portions $33^1$ of secondary S are supported directly by shaft $50^1$, extending through the central opening of the toroid. Shaft $50^1$ is supported by bearings $51^1$, in turn supported on the base of the machine. Coaxial inner portions $33^1$ support each other and the inner cylinder $60^1$ of support frame C through thin solid insulation material which separates them. The inner portions $33^1$ of secondary S have, on their left axial end, end portions $34^1$ connected which, in turn, connect to the left-hand contact disc $37^1$. The right-hand end portions $34^1$ and radially outer portions $35^1$ of the secondary S connect to the right hand contact disc $37^1$ and are somewhat similar in construction to those shown in FIG. 1. However, in this embodiment of the invention the support frame C is located inside the secondary S and has left and right hand radially circumferentially extending portions $61^1$ and a right hand outer axially circumferentially extending portion $62^1$. In this case no liquid coolant is used and the shells which make up the secondary S are close together and separated by solid insulation material from each other and from frame C. The stationary primary P consists of coil $30^1$, having terminal leads $31^1$ extending externally to the power source, a magnetically permeable core $32^1$ all embedded in solid electrically insulating material $38^1$ of suitable mechanical strength. The primary P is supported by bearing 48, in turn supported by cylinder $60^1$ of frame C and prevented from rotation by stops 49 or other suitable means. The primary is separated from the secondary assembly by the thickness of bearing 48 and by air gaps 47 on all of its other surfaces.

The slanted edges of work $10^1$ are brought together inside gap $39^1$, which separates the contact surfaces $41^1$ and $42^1$ of the transformer secondary. Weld current is conducted into the work $10^1$ by pressing the transformer secondary against it, said work $10^1$ being supported by non-metallic roller 99, in turn supported by its bearings 98. Centered within gap $39^1$ of the transformer secondary is a pressure roller 97 supported by lever 96. Said lever, made of magnetically permeable material, can move up and down within gap $39^1$ and is pivotally supported by bearing 95 from the base of the machine.

Somewhat similar to the weld pressure arrangement of FIGS. 1 and 2, the difference between the mechanical force, exerted by spring $22^1$, and a magnetic force, exerted by the primary transformer current flowing through windings $21^1$ of magnet core 94, is applied to lever 96. A portion of this differential force, proportional to the lever action of 96, presses, by means of roller 97, the slanted edges of work $10^1$ firmly together and against support roller 99 along a narrow line which forms a path of relative high conductivity through which most of the secondary current will pass, thereby heating the metal to weld temperature.

Figure 7B:
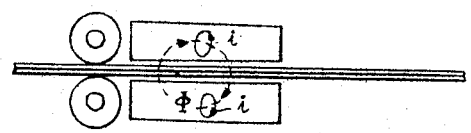
FIG. 7b is a simplified schematic diagram of a welding circuit.

The magnetic pressure devices shown in FIGS. 1, 2, 6 and 7a are shown to be made of solid magnetically permeable material. Since the welding current will be of relatively high frequency, these pressure devices would in reality either be laminated, or if laminations are not practicable, the high frequency primary transformer current is full wave rectified, as shown in FIG. 7b. If the primary current is monitored and suitably amplified for use with the magnetic pressure devices, the amplifier output would be a direct current signal proportional to the primary transformer current.

Constructing the secondary from spaced shells makes an efficient closed loop cooling system, sealed within the transformer assembly, possible. Part of the space between the frame and the secondary, part of the space between the secondary shells, and part of the space between the secondary and the primary is for this purpose filled with an insulating liquid having a moderate evaporate temperature, e.g. fluorcarbon. The secondary weld current flowing down through the shells to the work, and the heat generated on the transformer contact surfaces, plus the heat generated in the lower portions of the primary, cause the liquid to evaporate, which effectively cools the transformer assembly. The coolant vapor is condensed on the inside of the upper portion of the transformer secondary, which is externally cooled in a conventional manner, e.g. forced air, water sprayed on the sides of the contact discs, etc.

Figure 8A:
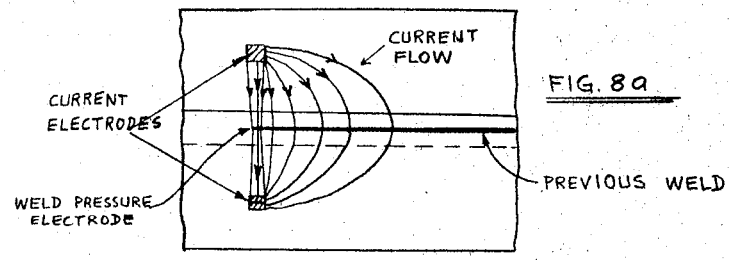
FIGS. 8a to 8d show patterns of current flow between the current electrodes, illustrating the effect of magnetic fields on the current distribution.

FIG. 8a illustrates on a somewhat enlarged scale the flow of current between the secondary current electrodes. Some of the current flows through the previously welded section and does not contribute to the weld. The amount of current bypassing the weld pressure electrodes can be reduced by means of magnetic fields. Such magnetic fields might be constant or alternating fields, generated by auxiliary means or by the welding current in suitable material brought close to the surface of the work.

Figure 8B:
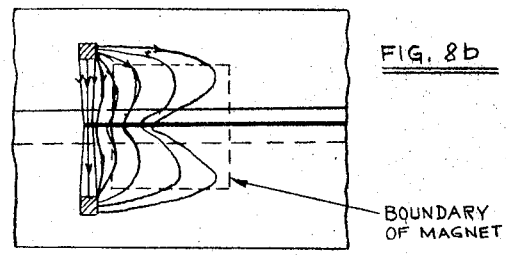

FIG. 8b illustrates how a magnetic field flowing out from the paper through the area shown as boundary of a magnet deflects the current toward the left.

Figure 8C:
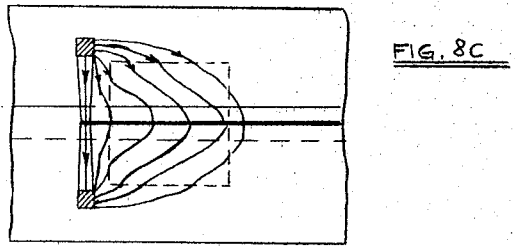

FIG. 8c demonstrates how a magnetic field flowing into the paper deflects the current toward the right.

In either case, the impedance of the current paths not contributing to the weld has been increased as compared to FIG. 8a. With sufficiently strong magnetic fields, most of the current will be forced to flow through the area to be welded together.

Figure 8D:
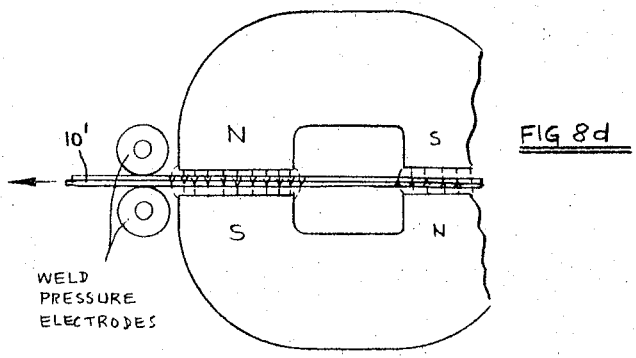

FIG. 8d shows how permanent or electromagnets might be arranged to concentrate the flow of current into the interface resistance of the material to be welded.

Figures 9A, 9B:
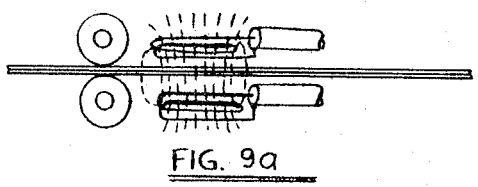
FIGS. 9a and 9b illustrate still other means of influencing the current flow pattern.

FIG. 9a shows how an alternating magnetic field, generated by auxiliary coils energized from the source that feeds the welding transformer primary and located close to the work and to the weld pressure wheels, can be utilized to concentrate the current into the interface resistance. Depending upon the phase relation between the magnetic field and the secondary welding transformer current, current patterns similar to FIG. 8b or FIG. 8c may be obtained.

Still another means to concentrate the flow of current is shown in FIG. 9b. Here magnetically permeable material is located close to the work and close to the weld pressure wheels. The magnetic field of current that flows through previously welded sections causes eddy currents in the magnetically permeable material indicated by internal current loops $i$. The current loops $i$ themselves generate magnetic fields which oppose the fields that originated them and thereby help to concentrate the weld current into the interface resistance.

The invention has been described with reference to preferred embodiments. Further modifications thereof, after study of this specification, will be apparent to those skilled in the art to which the invention pertains. It is my intention to include all such modifications, insofar as they come within the scope of the appended claims.

I, therefore, particularly point out and distinctly claim as my invention:

1. A transformer for electrically energizing metallic edges to be welded, said transformer comprising a toroidal primary, a one-turn toroidal secondary having a circumferentially extending split therein and substantially enclosing said primary, said split separating the contact surfaces of said secondary, said primary and said secondary being in spaced insulated relationship and at different voltage potentials, a rotary shaft extending transversely in supporting relationship through said secondary and rotary bearing means on said shaft, said secondary being comprised of a number of shells, said shells being insulated from each other except where they connect to the transformer contact surfaces, and said shells having a thickness small enough to assure approximately uniform distribution of current over the shell cross section at the transformer operating frequency, and a frame to rigidly support the contact surfaces, the shells of the secondary, and the primary on the rotary shaft.

2. A toroidal transformer as set forth in claim 1, wherein a coolant is circulated within the transformer assembly between the frame and the secondary, between the secondary shells and between the secondary and the primary assembly through bores in the primary shaft and through holes provided in the shells of the secondary.

3. A toroidal transformer as set forth in claim 1, wherein a coolant is circulated within the secondary of the transformer assembly around and between the shells which make up said secondary through bores in the rotary shaft and through holes provided in the shells of said secondary.

4. A toroidal transformer as set forth in claim 1, wherein for cooling purposes an insulating liquid of suitable evaporation temperature is sealed within the transformer assembly, said cooling liquid occupying part of the space between the frame and the secondary, part of the space between the shells which make up the secondary, and part of the space between secondary and primary, cooling means on the upper outer surfaces of the secondary to condense on the inner upper surfaces the vapors of the insulating liquid which have evaporated inside the lower part of the transformer while cooling said secondary and said primary.

5. A weld electrode pressure device with feedback from the primary weld current to automatically counteract changes in the interface resistance of the work, said pressure device being actuated by the difference between a preset mechanical force and a preset electromagnetic force, said electromagnetic force being derived such that it changes as the transformer current changes, the electromagnetic force being obtained by energizing a solenoid in an amount related to the primary current of the welding transformer, the solenoid having a movable and magnetically permeable core carrying a weld pressure wheel, said movable solenoid core also being acted upon by means imposing a mechanical force which is larger than the electromagnetic force and in a direction opposite to the electromagnetic force, the current flowing through the electromagnetic device being obtained by means for rectification of the primary current of the welding transformer.

6. A weld electrode pressure device with feedback from the primary weld current to automatically counteract changes in the interface resistance of the work, said pressure device being actuated by the difference between a preset mechanical force and a preset electromagnetic force, said electromagnetic force being derived such that it changes as the transformer current changes, the electromagnetic force being obtained by energizing a solenoid in an amount related to the primary current of the welding transformer, the solenoid having a movable and magnetically permeable core carrying a weld pressure wheel, said movable solenoid core also being acted upon by means imposing a mechanical force which is larger than the electromagnetic force and in a direction opposite to the electromagnetic force, the current flowing through the electromagnetic device being a direct current proportional to the primary current of the welding transformer, said direct current being obtained by means monitoring, suitably amplifying and rectifying the current flow in the welding transformer primary.

7. A transformer having electrodes and a secondary for supplying current to said electrodes, said secondary comprising shells housed one within another and with there being insulation between adjacent shells, the shells having adjacent ends which are in current-carrying connections with said electrodes.

8. A transformer having electrodes and a secondary for supplying current to said electrodes, said secondary comprising shells housed one within another and with there being insulation between adjacent shells, the shells having adjacent ends which are in current-carrying connections with said electrodes, each shell having a cross section sufficiently thin to assure approximately uniform distribution of current thereover at the transformer operating frequency.

9. A transformer having electrodes and a toroidal shaped secondary for supplying current to said electrodes, and a toroidal shaped primary housed within the secondary, said secondary comprising shells housed one within another, the shells being in current-carrying connection through said electrodes and there being insulated between the shells intermediate said electrodes.

10. A transformer according to claim 9 having means by which coolant may flow between the shells.

11. A transformer according to claim 9 further including means permitting rotation of the secondary while maintaining the primary stationary.

12. A welding transformer having a one-turn toroidal shaped secondary terminating at its outer periphery in axially spaced electrodes, the surfaces of said electrodes being electrically conductive surfaces of revolution extending 360 degrees and being centered on a common axis, said secondary turn intermediate said electrodes being comprised of shells housed one within another, the ends of the shells being in current-carrying connections with said electrodes and the shells remote from said electrodes being separated by insulation, means for journalling said secondary for rotation about said common axis, a toroidal shaped magnetically permeable core housed within the innermost shell of the secondary and being coaxial with said common axis, a toroidal shaped primary wound around said core, and means for journalling said secondary for rotation about said common axis.

13. A welding transformer having a one-turn toroidal shaped secondary terminating at its outer periphery in axially spaced electrodes, the surfaces of said electrodes being electrically conductive surfaces of revolution centered on a common axis, said secondary turn intermediate said electrodes being comprised of shells housed one within another, the ends of the shells being in current-carrying connections with said electrodes and the shells remote from said electrodes being separated by insulation, means for journalling said secondary for rotation about said common axis, a toroidal shaped magnetically permeable core housed within the innermost shell of the secondary and being coaxial with said common axis, a toroidal shaped primary wound around said core, means for journalling said secondary for rotation about said common axis, and means automatically tending to maintain the resistance at the weld joint at a substantially constant value.

14. A transformer comprising a toroidal shaped secondary, welding electrodes connected to said secondary, a toroidal shaped primary housed within the secondary, means for applying pressure to the interface of the work, and means responsive to transformer primary current changes for varying the pressure applied by said pressure-applying means in a manner tending to maintain the interface resistance of the work substantially constant.

15. Welding apparatus comprising a transformer, welding electrodes, means for applying pressure to the interface of the work, and control means for varying the pressure applied by said pressure-applying means in a manner tending to maintain the interface resistance of the work substantially constant, said control means including an electromagnetic device and means for supplying direct current to said electromagnetic device responsive to changes in transformer primary current.

References Cited by the Examiner

UNITED STATES PATENTS

| | | | |
|---|---|---|---|
| 1,145,413 | 7/1915 | Hatch | 219—86 |
| 1,582,269 | 4/1926 | Johnson et al. | 219—63 |
| 2,136,059 | 11/1938 | Sciaky | 219—59 |
| 2,137,909 | 11/1938 | Hagedorn et al. | 219—86 |
| 2,233,526 | 3/1941 | Hagedorn et al. | 219—86 |
| 3,130,290 | 4/1964 | Keska | 219—63 |

FOREIGN PATENTS 1,020,294   11/1952   France.

RICHARD M. WOOD, *Primary Examiner.*